US009242386B2

(12) United States Patent
Aviza et al.

(10) Patent No.: US 9,242,386 B2
(45) Date of Patent: Jan. 26, 2016

(54) USE OF PRINTED CIRCUIT BOARD, ELECTRONIC COMPONENT, AND SEMI-CONDUCTOR ASSEMBLY EQUIPMENT FOR THE ASSEMBLY OF RAZORS AND COMPONENTS THEREOF

(75) Inventors: Gregory David Aviza, Marlborough, MA (US); Yongqing Ju, Medfield, MA (US); Vitaly Pesikov, Canton, MA (US)

(73) Assignee: The Gillette Company, Boston, MA (US)

(*) Notice: Subject to any disclaimer, the term of this patent is extended or adjusted under 35 U.S.C. 154(b) by 338 days.

(21) Appl. No.: 13/157,998

(22) Filed: Jun. 10, 2011

(65) Prior Publication Data
US 2011/0313559 A1 Dec. 22, 2011

Related U.S. Application Data

(60) Provisional application No. 61/356,511, filed on Jun. 18, 2010.

(51) Int. Cl.
*B26B 21/00* (2006.01)
*B26B 21/40* (2006.01)
*H05K 13/04* (2006.01)

(52) U.S. Cl.
CPC ........ *B26B 21/4068* (2013.01); *H05K 13/0404* (2013.01)

(58) Field of Classification Search
None
See application file for complete search history.

(56) References Cited

U.S. PATENT DOCUMENTS

| 3,866,298 A * | 2/1975 | Nowak ........................... 29/783 |
| 6,839,968 B2 * | 1/2005 | Brown et al. .................... 30/50 |
| 7,292,905 B1 * | 11/2007 | Durrant et al. ................ 700/108 |
| 2005/0246045 A1 * | 11/2005 | Sugihara et al. .............. 700/109 |
| 2008/0110230 A1 * | 5/2008 | Guay et al. .................... 72/379.2 |
| 2009/0000110 A1 | 1/2009 | Maenishi |
| 2012/0216388 A1 * | 8/2012 | Ntavos et al. ................... 29/428 |

FOREIGN PATENT DOCUMENTS

WO WO-2011/042060 A1 4/2011

OTHER PUBLICATIONS

Tien-Chien Chang, Richard A. Wysk, and Hsu-Pin Wang, Computer-Aided Manufacturing, 2nd Edition, 1998, pp. 192-213.*

(Continued)

*Primary Examiner* — Darrin Dunn
*Assistant Examiner* — Christopher E Everett
(74) *Attorney, Agent, or Firm* — Joanne N. Pappas; Kevin C. Johnson; Steven W. Miller

(57) ABSTRACT

The invention discloses a novel application of standard printed circuit board (PCB) assembly modules, electronic assembly, and/or semiconductor assembly equipment for the assembly of consumer products, such as razor cartridges. In addition, nozzles of the pick/place component placement machine of the present invention may be desirably adapted to operate on type of razor cartridge component (e.g., blade, lubricating strip) disposed on a pallet. The adapted nozzle may include adaptors which may have an elongated portion, an angled portion, a tapered portion, a gripper portion, a curved portion, a rounded portion, a pointed tip, a stamper, a marker, a printer, a guide portion, a spring portion, a moveable leg, or any combination thereof, for operating on a razor cartridge component.

11 Claims, 15 Drawing Sheets

(56) References Cited

OTHER PUBLICATIONS

Elias N Malamas, Euripides G.M Petrakis, Michalis Zervakis, Laurent Petit, Jean-Didier Legat, A survey on industrial vision systems, applications and tools, Image and Vision Computing, vol. 21, Issue 2, Feb. 10, 2003, pp. 171-188.*

Masri Ayob and Graham Kendall, "A Survey of Surface Mount Device Placement Machine Optimisation: Machine Classification," Computer Science Technical Report No. NOTTCS-TR-2005-8, Sep. 2005.*

T. Knuutila, S. Pyöttiälä and O. S. Nevalainen, "Minimizing the Number of Pickups on a Multi-Head Placement Machine," The Journal of the Operational Research Society, vol. 58, No. 1 (Jan. 2007), pp. 115-121.*

PCT International Search Report with Written Opinion in corresponding Int'l appln. PCT/US2011/04078 dated Oct. 31, 2011.

Jonathan Collins: "Auto-ID Lab Remakes Manufacturing", RFID Journal, Dec. 15, 2003—URL http://www.rfidjournal.com/aticle/view/688.

"Robotic System Speeds Throughout", Quality Manufacturing Today, Nov. 1, 2008, URL http://www.qmtmag.com/images/Nov08.pdf—p. 28.

* cited by examiner

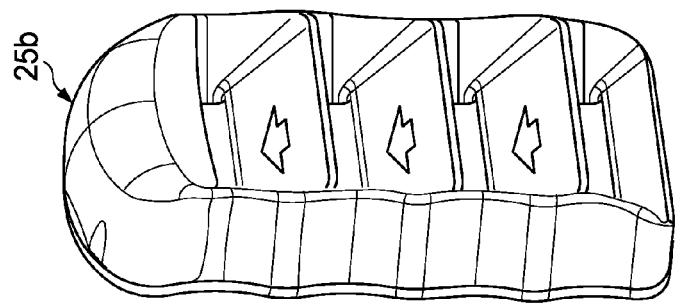
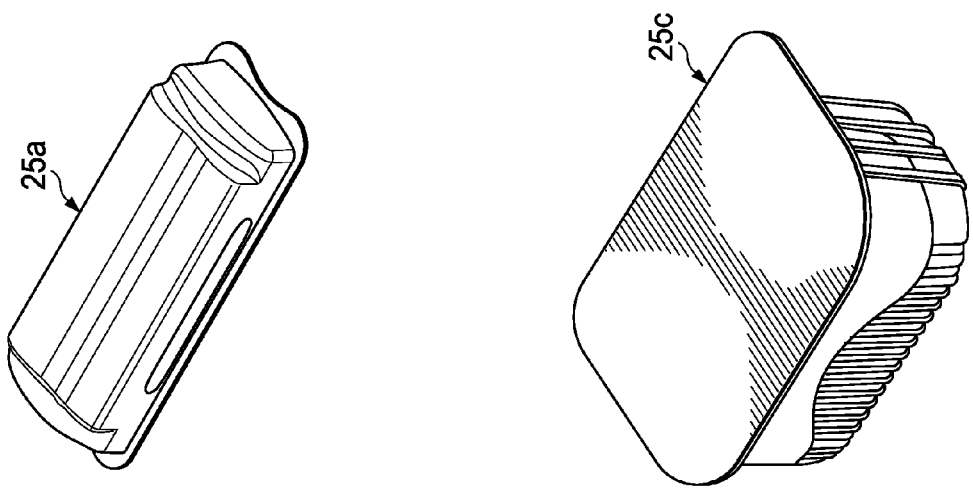
FIG. 2A

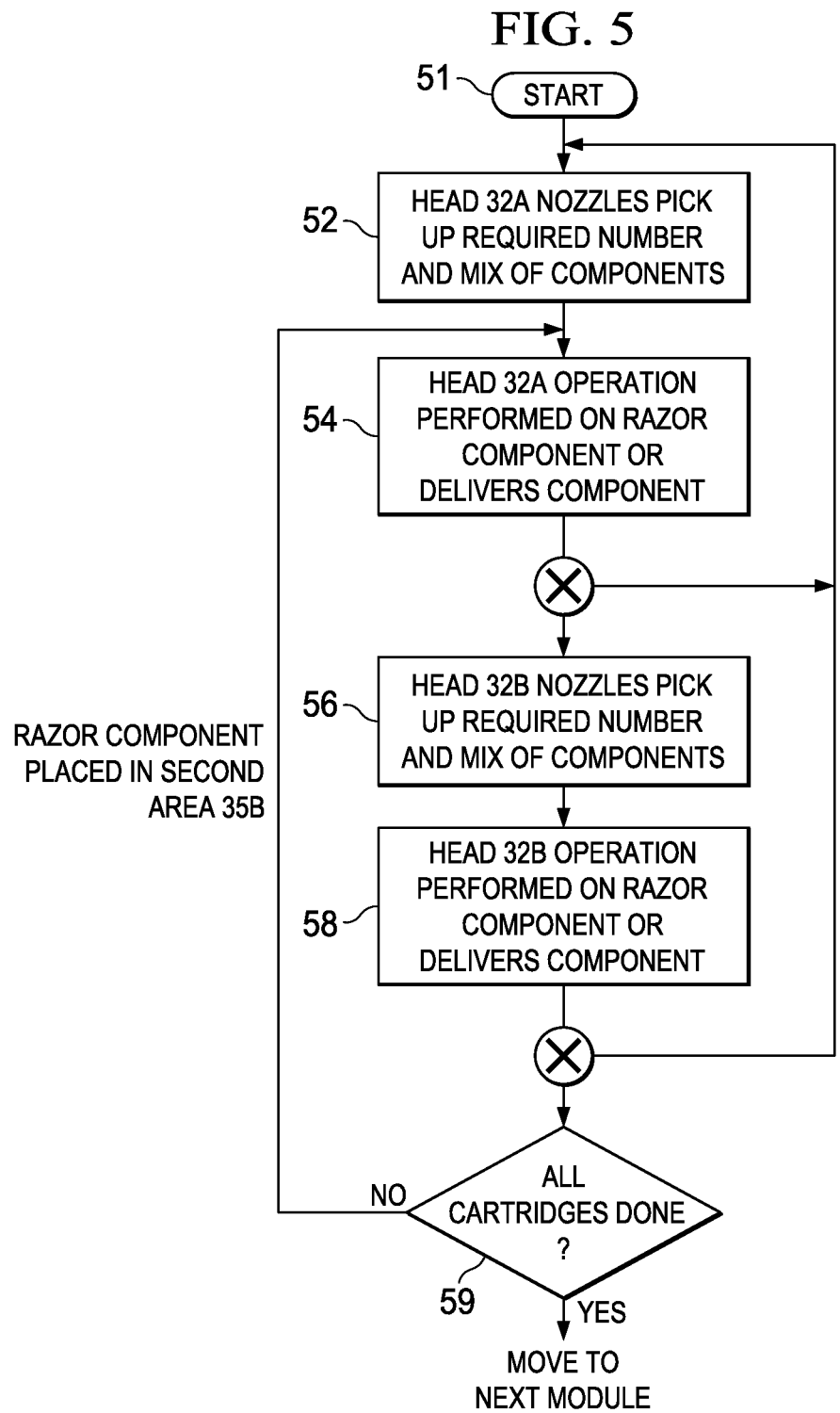

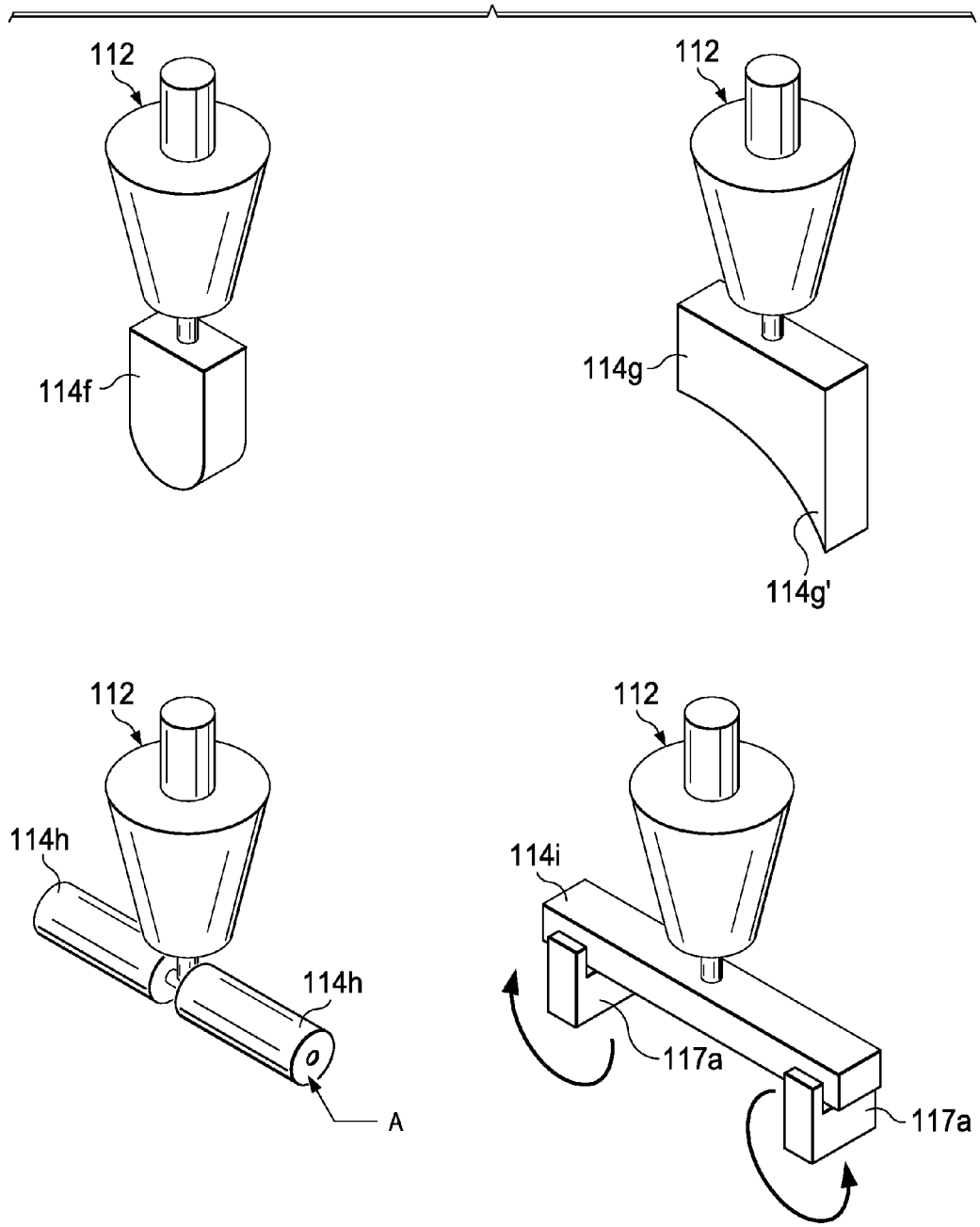

USE OF PRINTED CIRCUIT BOARD, ELECTRONIC COMPONENT, AND SEMI-CONDUCTOR ASSEMBLY EQUIPMENT FOR THE ASSEMBLY OF RAZORS AND COMPONENTS THEREOF

CROSS-REFERENCE TO RELATED APPLICATIONS

"This application claims the benefit of U.S. Provisional Application No. 61/356,511 filed Jun. 18, 2010.

FIELD OF THE INVENTION

This invention relates to razor cartridges, and more particularly to the manufacturing of consumer products such as razors and razor cartridges.

BACKGROUND OF THE INVENTION

In current manufacturing processes, wet shaving or razor cartridges are generally assembled on production lines dedicated to a particular type of razor cartridge. Some known assembly machine layouts include machines which are synchronous, non-synchronous, or continuous which may have in-line indexing, dial (e.g., rotary) or carousel capabilities.

On these types of production lines, in-process cartridges are transported, either by indexing or continuous motion, to the dedicated assembly stations such as stations 12 and 14 shown in FIG. 1 and stations 14 and 16 in a known dial or rotary based assembly machine layout 18 shown in FIG. 1A. For instance, dedicated assembly station 12 (and similarly station 14) generally handles only one type of component, the same component (e.g., a cap) over and over again, while dedicated assembly station 14 (and similar station 16) generally will handle only one type of component (e.g., a blade) over and over again. Thus, each station is designed to handle or deal with only one type of particular component (e.g., a cap) and as such, is configured to grasp and subsequently release only one type of component. At these stations, whether in an in-line or rotary production line of FIG. 1 or FIG. 1A, the components (e.g., a cap or a blade), required for the completion of the assembly of the cartridge, are added to the cartridge.

Thus, the operations of these types of production lines are generally sequential in nature (for intermittent, continuous, and asynchronous assembly methods), since a razor cartridge component moves along from station to station where each station performs a discrete operation (e.g., adding a cap to the cartridge housing) until a razor cartridge is formed.

These stations perform the assembly with custom, precision, and often unique tooling equipment such as cams and levers. Dedicated feed systems F1, F2, F3, and F4 as shown in FIGS. 1 and F5, F6, F7, F8, and F9 as shown in FIG. 2, may not only provide individual components to the assembly machine, but may also remove completed assemblies from the machine. Such feed systems may also oftentimes also require with custom, precision, and often unique tooling. These feed systems are generally "hard-connected" to the machine, in that they are connected both mechanically and electrically. Thus, generally manufacturing processes of these assembly machine types are by their very nature typically designed or dedicated to just one razor product family. That is, one assembly machine is generally dedicated to making one type of product, (e.g., razor cartridge, razor handle, etc.) for one product family, for instance the Gillette® Sensor® product family. This machine would not in turn be easily transferrable to or capable of being used for any other product family or families, such as the Gillette® Venus®, Gillette® Mach3®, or Gillette® Fusion® product families, nor vice-versa.

Thus, this type of process or design presents a major disadvantage with limited flexibility for making changes in manufacturing, such as changes that may be needed for producing cartridges for different product families or changing the operation layout within the same assembly machine and/or feed system.

For instance, if demand is low for one particular product family, but high for another, the low demand product's assembly machine may be dormant but because the dormant assembly machine is generally only dedicated by design to handle one particular type of device or product family, it most probably could not be utilized to assist in producing the high demand product.

Another disadvantage of this type of equipment is generally that the cost of capital may be very high, as every new product may necessarily require its own customized and newly designed tooling, and the equipment for prior products may, in all likelihood, not be reusable for new product families.

One potential solution that may improve flexibility may be to program robots (e.g., non-synchronous pallet based or stand-alone robots) at each assembly station which may typically include vision driven systems. While robots may advantageously provide an increase in flexibility they may be slower or have reduced precision over the known dedicated assembly and feeding systems which are generally expeditiously optimized, and they may come with a significant initial capital and cost investment along with substantial upfront custom designing.

Thus, there is at least a need to improve the manufacturing processes to obtain more flexibility across product families.

SUMMARY OF THE INVENTION

The invention provides a razor cartridge assembly apparatus including a pick/place component placement machine operating on at least one razor cartridge component. A nozzle on the pick/place component placement machine is adapted depending on a type of said at least one razor cartridge component. The adaptor may include an elongated portion, an angled portion, a tapered portion, a gripper portion, a curved portion, a rounded portion, a pointed tip, a stamper, a marker, a printer, a guide portion, a spring portion, a moveable leg, or any combination thereof, for operating on at least one razor cartridge component.

The operations performed on the razor cartridge component include contacting, picking, placing, holding, snap fitting, articulated inserting, angular inserting, cutting, assembling, clipping, crimping, staking, orienting, transporting, dispensing, inspecting, identifying, cold heading, marking, stamping, printing (e.g., laser or ink), etching, force placement (e.g., pushing, moving, sliding) or other physical action or part movement, or any combination thereof, at least one razor cartridge component, or at least one exterior surface of at least one razor cartridge component. The operation of orienting includes rotating, pivoting, swiveling, spinning, revolving, tilting, turning, aiming, twisting, pointing, inclining, rolling, or any combination thereof.

The invention provides a method of utilizing a pick/place component placement machine including at least one nozzle, each nozzle operating on at least one razor component.

The invention also provides an assembly apparatus including a pick/place component placement machine where at least one nozzle is adapted to operate on at least one consumer product component.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

FIG. 2A is a schematic view of additional razor cartridge components of the present invention.

FIG. 5 is a flow diagram for the assembly of a razor cartridge in accordance with the present invention.

FIGs. 11A and 11B depicts various adaptors or nozzle extension members in accordance with the present invention.

DETAILED DESCRIPTION OF THE INVENTION

One novel area that has been not been developed in the prior art is the use of standard printed circuit board (PCB) assembly modules, electronic assembly, and/or semiconductor assembly equipment, which have been up to now used for other type of products or industries (e.g., computer or automotive), for the assembly of consumer products, such as wet shaving or razor products and components thereof, such as razor cartridges. These standard printed circuit board (PCB) assembly modules, electronic assembly, and/or semiconductor assembly equipment machines are a major departure from current known manufacturing processes for razor products described in the Background of the Invention section, such as dedicated assembly machines.

The term "standard modules" or "modules" or "pick/place component placement machine" as used in the present invention signifies these traditional printed circuit board (PCB) assembly equipment, electronic assembly equipment, and/or semiconductor assembly equipment. Many companies provide this type of equipment, such as Samsung, Europlacer, Sony, Juki, Panasonic, Fuji, Universal Instruments Corporation, Siemens, to name a few.

As will be described herein, in the present invention, these traditional standard modules are used as they are, and/or adapted, configured and/or tooled in such a way as to produce a viable production assembly line for manufacturing razor/shaving cartridges which may have different requirements than typically required of the standard modules of the prior art.

The PCB modules, electronic assembly, and/or semiconductor assembly equipment of the present invention may desirably perform various razor cartridge assembly operations which may include, but would not be limited to, operations such as contacting, picking, placing, holding, snap fitting, articulated inserting, angular inserting, cutting, assembling, clipping, crimping, staking, orienting, transporting, dispensing, inspecting, identifying, cold heading, marking, stamping, printing (e.g., laser or ink), etching, force placement (e.g., pushing, moving, sliding) or other physical action or part movement, or any combination thereof, as will be detailed below which may generally be required for cartridge assembly.

The operation of orienting may desirably include movements such as rotating, pivoting, swiveling, spinning, revolving, tilting, turning, aiming, twisting, pointing, inclining, rolling, or any combination thereof.

Figure 1:
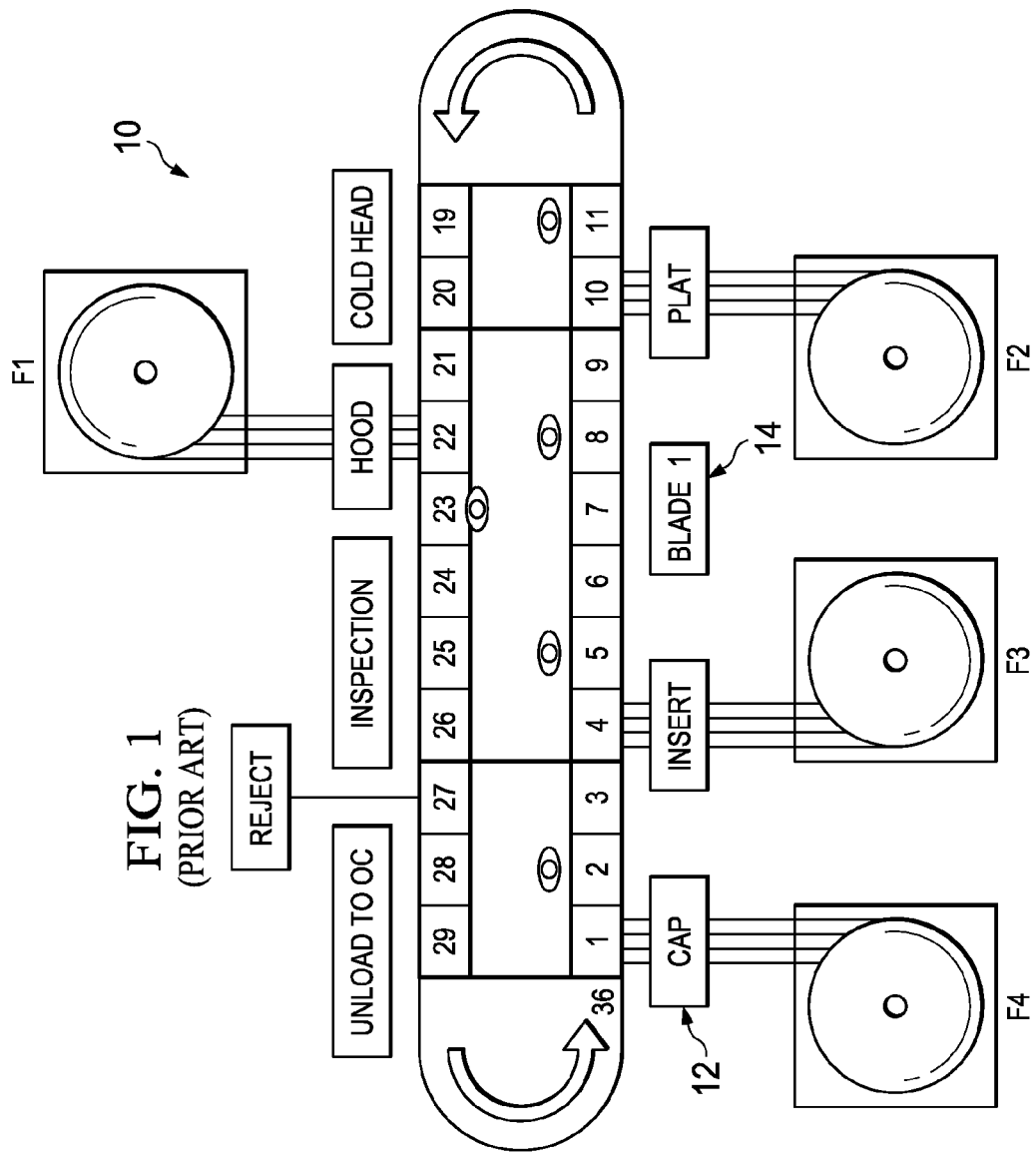
FIG. 1 is a schematic view of a prior art in-line assembly system for a razor cartridge.
Figure 1A:
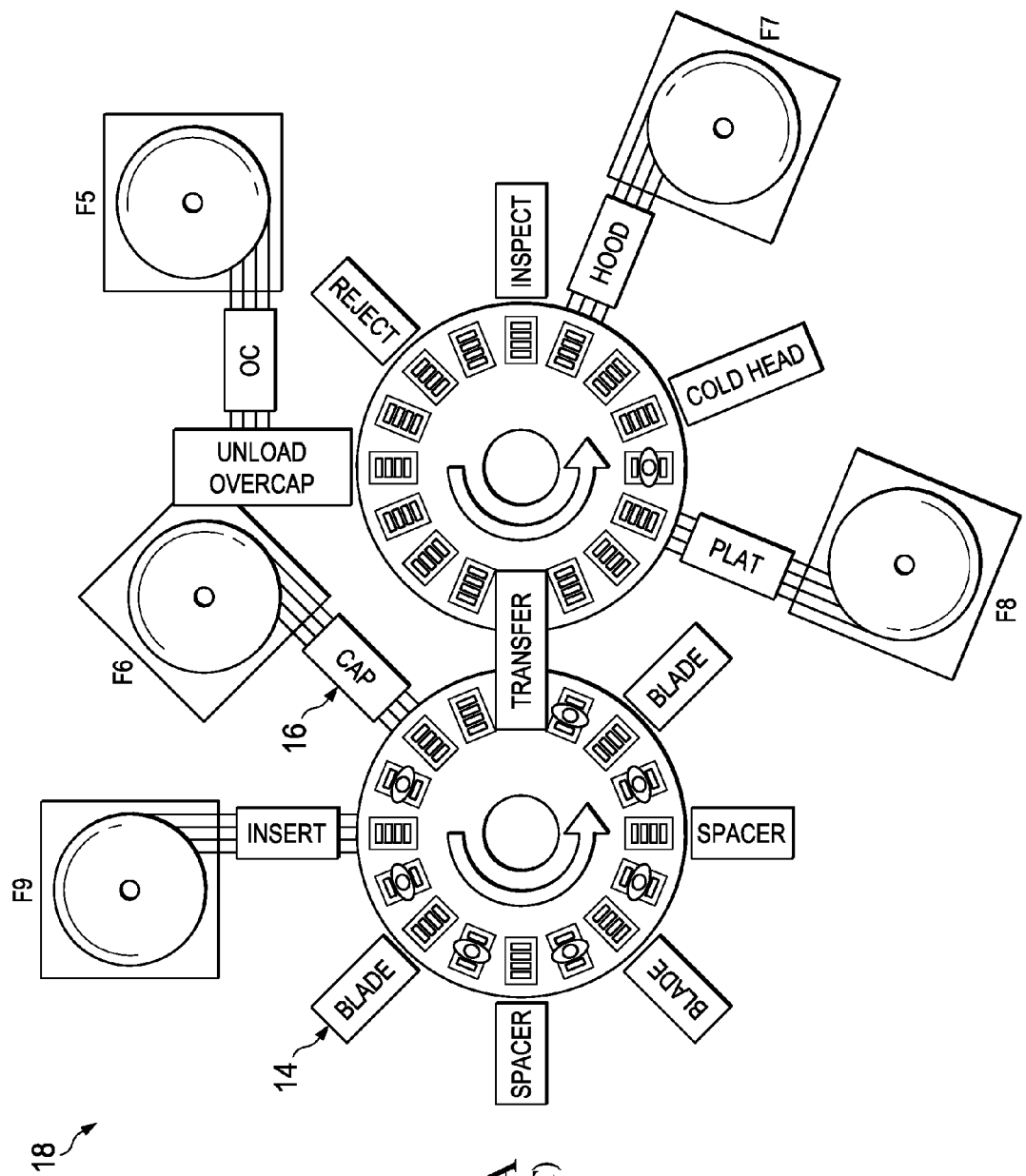
FIG. 1A is a schematic view of a prior art rotary assembly system for a razor cartridge.
Figure 2:
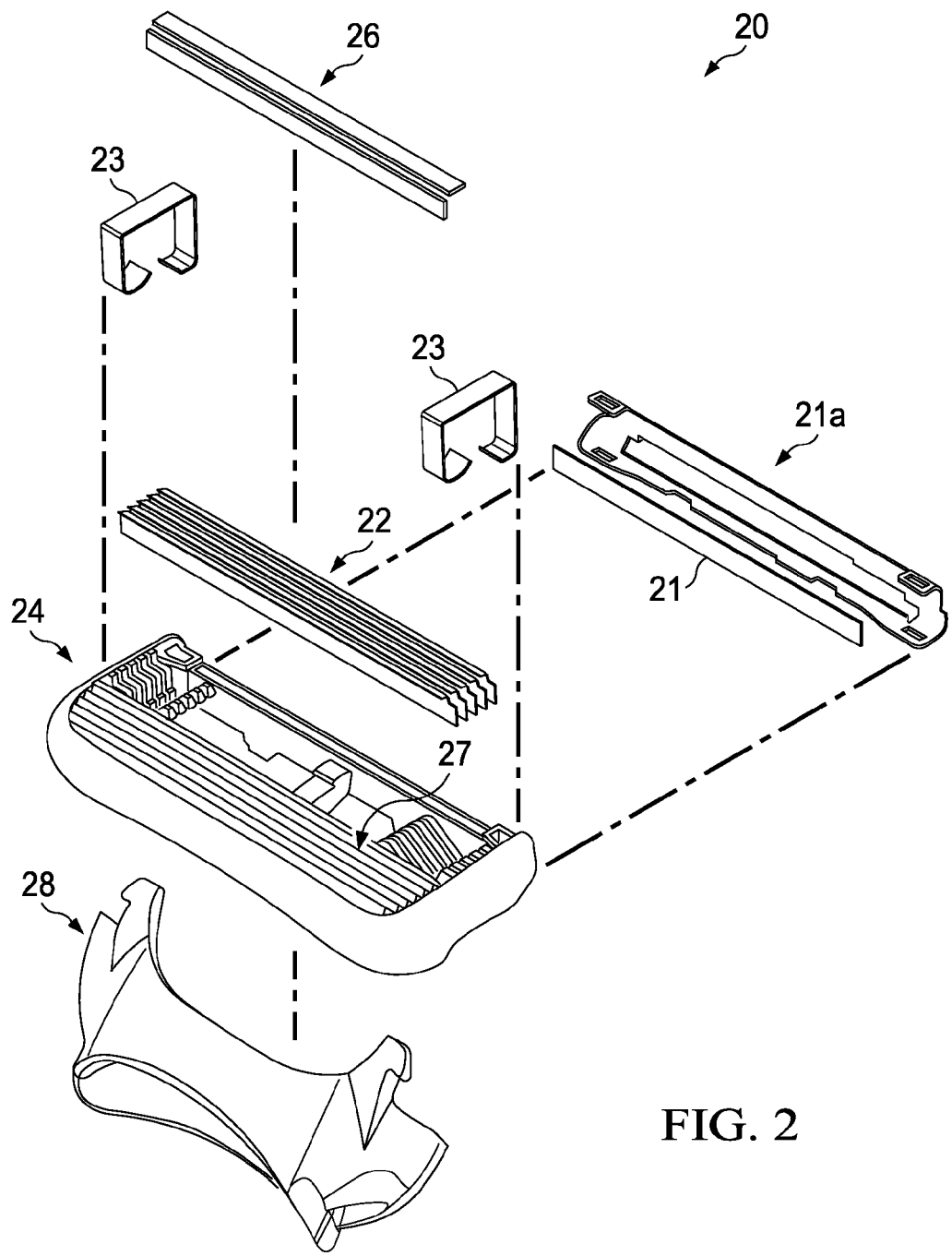
FIG. 2 is a schematic view of a various unassembled razor cartridge components of the present invention.

The term "razor cartridge component" and "razor component" as used in the present invention signifies the components necessary for a specific type of razor cartridge. Generally, as shown in FIG. 2, a razor cartridge 20 may desirably include at least one cap 26, (e.g., plastic component or including a lubricating strip, liquid dispensing means, gels, or other chemistries, etc.)

at least one guard 27, at least one razor blade 22 (e.g., bent blade, blade with blade support or flat blade), at least one housing, frame or platform 24, at least one spacer (not shown), at least one trimmer 21, at least one trimmer frame 21a, at least one clip 23, at least one cartridge connecting structure 28, at least one overcap 25a, dispenser 25b, or dispenser container or tub 25c (shown in FIG. 2A), or any combinations thereof.

Figure 2B:
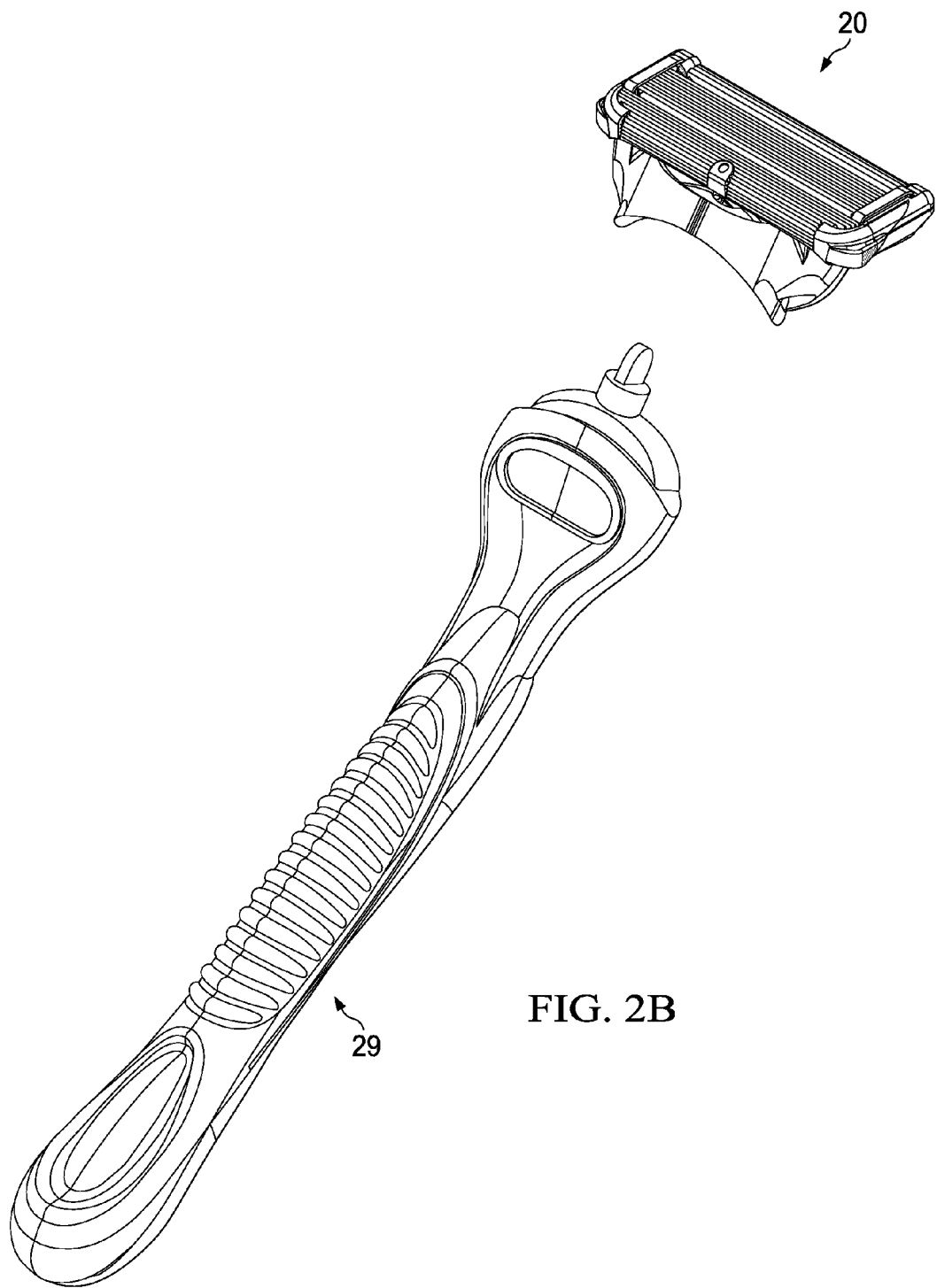
FIG. 2B is a perspective view of a razor handle detached from an assembled razor cartridge.

Other components of a razor cartridge may include an interconnect member or a cartridge connecting structure 28 or other pivoting structure to connect a cartridge to a handle. For the formation of a razor system product, a razor handle 29 (as shown in FIG. 2B) and its various components comprised of elastomeric, metal, plastic, or coated plastics may also be included as components necessary in the final assembly. As such, depending on the type of razor cartridge or razor product to be assembled, the components to be utilized can be determined accordingly. In this way, the assembly and production of any component or device is possible, from simple, single bladed cartridges to the most complex types of cartridges. For other types of consumer products, such as cosmetic, medical or dental products, similar determinations for their respective components may be extrapolated from the present invention.

One major advantage of this novel application of standard modules is the avoidance of constructing new machines or custom, precision, and unique machine frames, structures, guarding, or chassis to perform assembly operations. This novel application thus has the advantage of reducing capital build cost by benefiting from the economies of scale of a different industry and reduction of design and build time. In addition, a larger percentage of the machine has resale value to a larger audience and can be sold on the open market without fear of losing trade secrets.

These advantages are made possible because generally PCB modules, electronic assembly, and/or semiconductor assembly equipment, innately work on the principle of having high speed, servo driven, Cartesian gantry, picking and placing multiple types of components generally with nozzles capable of handling multiple types of components or multiple product shapes via vacuum or suction, mechanical (e.g., grippers), electrical or magnetic means or any combination thereof.

The handling of razor components by standard PCB modules, electronic assembly, and/or semiconductor assembly equipment, may require novel and/or specialized modifications, interfaces or adaptors as will also be discussed below.

Figure 3:
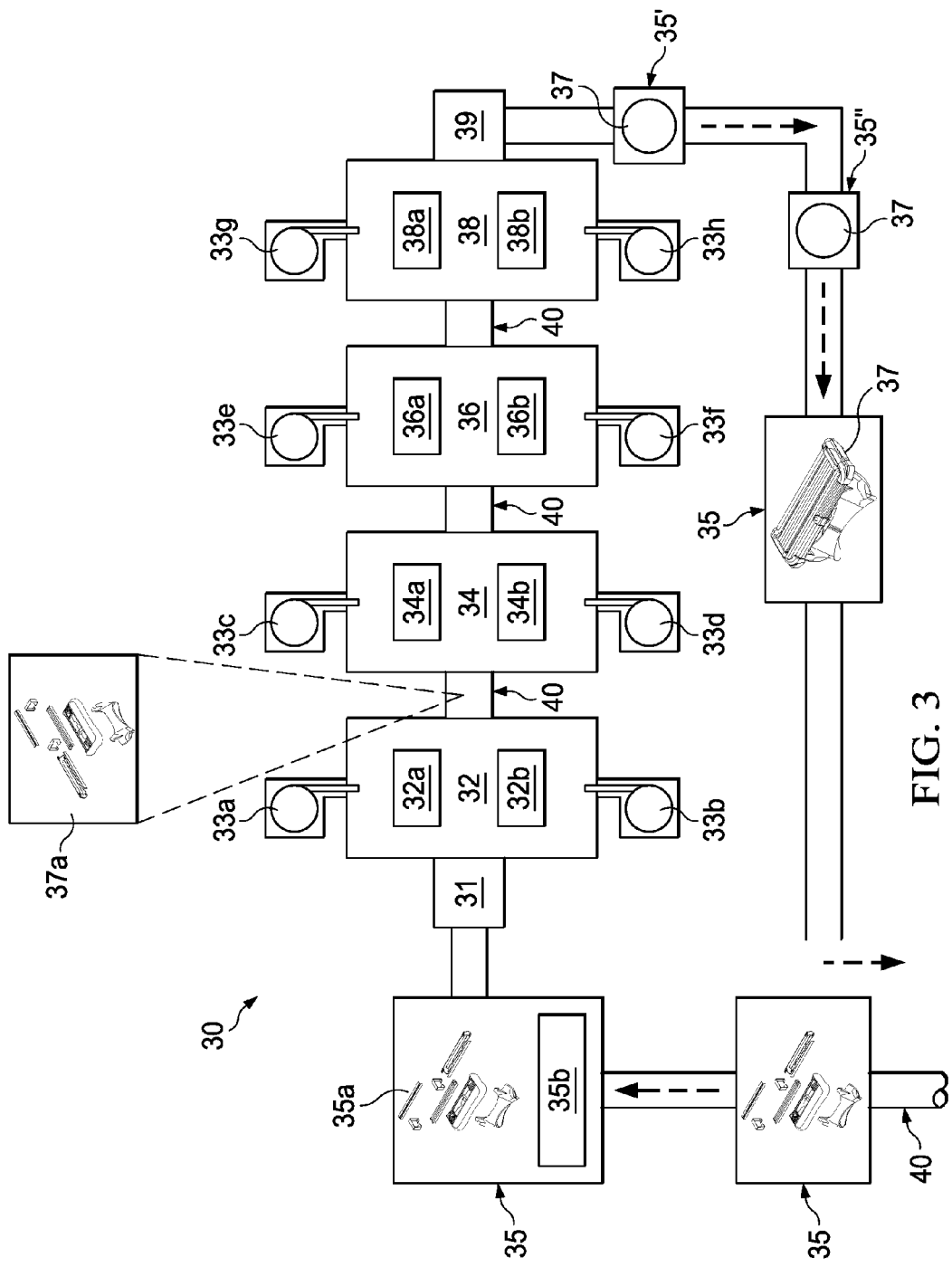
FIG. 3 is a schematic view of a pick/place component placement machine for a razor cartridge in accordance with the present invention.

Referring now to FIG. 3, an assembly machine or a pick/place component placement machine 30 including first module 32, second module 34, third module 36 and fourth module 38 is provided in accordance with the present invention. These modules perform the assembly operations required to construct razor cartridges and may include PCB, electronic assembly and/or semiconductor assembly equipment of the prior art. The modules may or may not be identical in structure or function.

The machine 30 has an input area 31 where the formation of a cartridge will generally begin and an output area 39 where a razor cartridge 37 will exit after assembly or a portion of the assembly is completed.

As cartridges are assembled, they may desirably be held on one or more pallets 35 which may travel through each module as the cartridges are processed. Pallets may be carriers, nests, trays or other transport devices for cartridge components. The pallets may carry one or more cartridges.

Each pallet 35 may desirably return to the beginning of the production line 40. Such a system may generally be referred to as a "recirculating carrier" or asynchronous pallet based system. Multiple pallets 35 may be conveyed on the production line 40.

Each module of the present invention may generally include at least one head. As shown in FIG. 3, each module (first module 32, second module 34, third module 36, and fourth module 38) is depicted having two heads each respectively, heads 32a and 32b for the first module 32, heads 34a and 34b for the second module 34, heads 36a and 36b for the third module 36, and heads 38a and 38b for the fourth module 38.

Each head of each module may desirably have at least one nozzle mounted thereon. The nozzle may be mounted via mechanical means such as via a spindle (not shown) where the spindle connects the head with the nozzle and is capable of rotating. Standard PCB, electronic assembly and/or semiconductor assembly equipment may have any number of nozzles disposed around the head. For instance, some known systems may have 8, 12, 18, 20, or up to 30 nozzles.

Thus, by having at least one head (each possibly having different nozzles or "end effectors" as will be described below) associated with each module, the arrangement of FIG. 3 provides increased flexibility in functionality and the addition of heads per module, provides greater throughput in the assembly of razor cartridges over the prior art. It should also be noted that each nozzle may desirably be performing an operation or combination of operations and as such, "parallel operations" may be occurring. For example, one nozzle may be placing a component while a different nozzle may be orienting a component.

The modules are supplied with cartridge components by one or more standard or custom feed systems, or any combination thereof, where each feed system is generally flexibly connected to a module via an interface. Each module in FIG. 3 is depicted as desirably including two feed systems; for instance, feed systems 33a and 33b for module 32, feed systems 33c and 33d for module 34, feed systems 33e and 33f for module 36, and feed systems 33g and 33h for module 38. The feed system 33a generally serves a component type (e.g., housings) to head 32a of module 32 whereas feed system 33b generally serves a different component type (e.g., guards) to head 32b. Similarly, feed system 33c serves head 34a (e.g., blades) while feed system 33d feeds head 34b with another type of component (e.g., lubricating strip), and so on.

Initially, pallets 35 may typically be empty with components being placed thereon subsequently via heads having been served by their respective feed system. This placement typically occurs in the center of each module or proximal to the module. Alternatively, pallets 35 may initially have components already, having been place thereon via processes elsewhere. An empty pallet and a pallet with components already thereon are shown in FIG. 3.

Generally, regardless if empty or not, the pallet 35 desirably serves as a carrier, carrying cartridge components in at least one area, depicted in FIG. 3 as a first area 35a. Pallet 35 may be desirably conveyed or move along on a type of conveyer belt or production line 40. The pallet 35 may generally desirably travel to the center of each of the modules 32, 34, 36, and 38 shown in FIG. 3 as it transports components along on production line or conveyor belt 40.

For instance, once the pallet 35 has moved to the center or in the proximal area of module 32, the heads 32a and 32b of module 32 may then desirably interface with feed systems 33a and 33b of module 32 to obtain the required cartridge components and place them on an area of the pallet, such as first area 35a.

Each module of the present invention may also generally work in a "batch process" mode.

A batch process mode may be defined for purposes herein as the capability to obtain and/or operate on more than one type of component to be processed. For instance, the heads may themselves desirably move or travel over to the first area 35a where a supply of parts or razor components are found (e.g., a part feeding area) and where it may pick up one or multiple parts to work with. These parts may or may not be the same type. The head may then generally move to a second area, the center of module 32 (e.g., the assembly area) where it may desirably deliver or operate on one or multiple parts. There may be multiple areas on a pallet used for either assembly or staging for additional assembly work or manipulation. Cartridge components may be delivered directly to the cartridge being assembled on pallet 35, or may be transported to one or more separate areas 35a or 35b of the pallet 35. A second area 35b may be located on the same pallet 35 as shown in FIG. 3 or it may be located in an area on a different pallet 35', 35", etc. conveyed on line 40, or on a particular assembly location of the actual razor cartridge (e.g., end target placement) such as on a housing or frame 24.

In one scenario, head 32a of first module 32 may be utilized to pick up multiple cap components 26 (e.g., a lubricating strip component) which are being carried on pallet 35 being conveyed on conveyor belt or production line 40 or the head 32a may obtain these cap components via feed system 33a, pick up these cap components and then insert them onto a specific area in a razor housing or frame 24 which may also be held on the same pallet 35 or on a different proximal pallet. The second head 32b of first module 32 may be utilized to pick and place a different component (e.g., guard component 27) to be disposed in cartridge housing or frame 24 from feed system 33b.

This partially assembled cartridge 37a (e.g., housing 24 with guard 27 and cap 26) may then be transferred via pallet 35 out of the first module 32 to the second module 34 where heads 34a and 34b, interfacing with feed systems 33c and 33d, are utilized to pick up one or more additional razor cartridge components (e.g., one or more blades 22) and place these components onto the razor housing 24.

This process may desirably continue progressing through to the subsequent modules 36 and 38 shown in FIG. 3 where different functions occur and until a complete razor cartridge 37 is finally formed. Finally formed cartridge 37 may be unloaded at the end of the line 40 or passed onto a different machine (not shown) for further assembly (e.g., attachment to a handle). In addition, the present invention contemplates that a head may desirably work effectively in reverse, in that it unloads finally formed or completed cartridges from pallets and delivers them to the feed system to be transported elsewhere.

Alternatively, heads 32a and 32b and 34a and 34b of first and second modules 32 and 34 respectively may be configured to each pick up multiple razor cartridge components of a different type. For instance, in lieu of head 32a picking/placing cap components, it may be configured to pick/place any number of components, e.g., 5 housings, 10 blades, 5 caps, etc., and in any combination thereof. This configuration may be applied to any module arrangement.

In addition, multiple cartridges may be formed simultaneously using the processes described above. The batch processing mode of the modules allows for potentially greater output rates theoretically as high as about 100% to about 300% than possible if each module were working on individual parts as in the prior art.

In addition, by having one or more nozzles mounted on the heads, as will be described in more detail below, where the nozzles are desirably capable of picking up and placing and performing operations described herein on any number of the same type of parts, any number of different parts, or any combination thereof, the flexibility of the present invention system is also substantially increased For instance, the switching or changing from assembling one type of product to another different type of product, may, in accordance with the present invention, generally be akin to a "push-button" or simple change in some cases, whereas in the prior art, in order to change from assembling one product type to a different product type, the prior art machines would generally be "on hold" (e.g., not in use) anywhere from several hours to potentially many months.

Thus, the present invention not only allows for increased customization and the ability to balance equipment costs, sizes, and rates, but also, all the while providing the same assembly functionality and desirably at a higher output rate.

Additionally, with the increase in flexibility, systems can be rapidly scaled up and rearranged or reconfigured.

Figure 4:
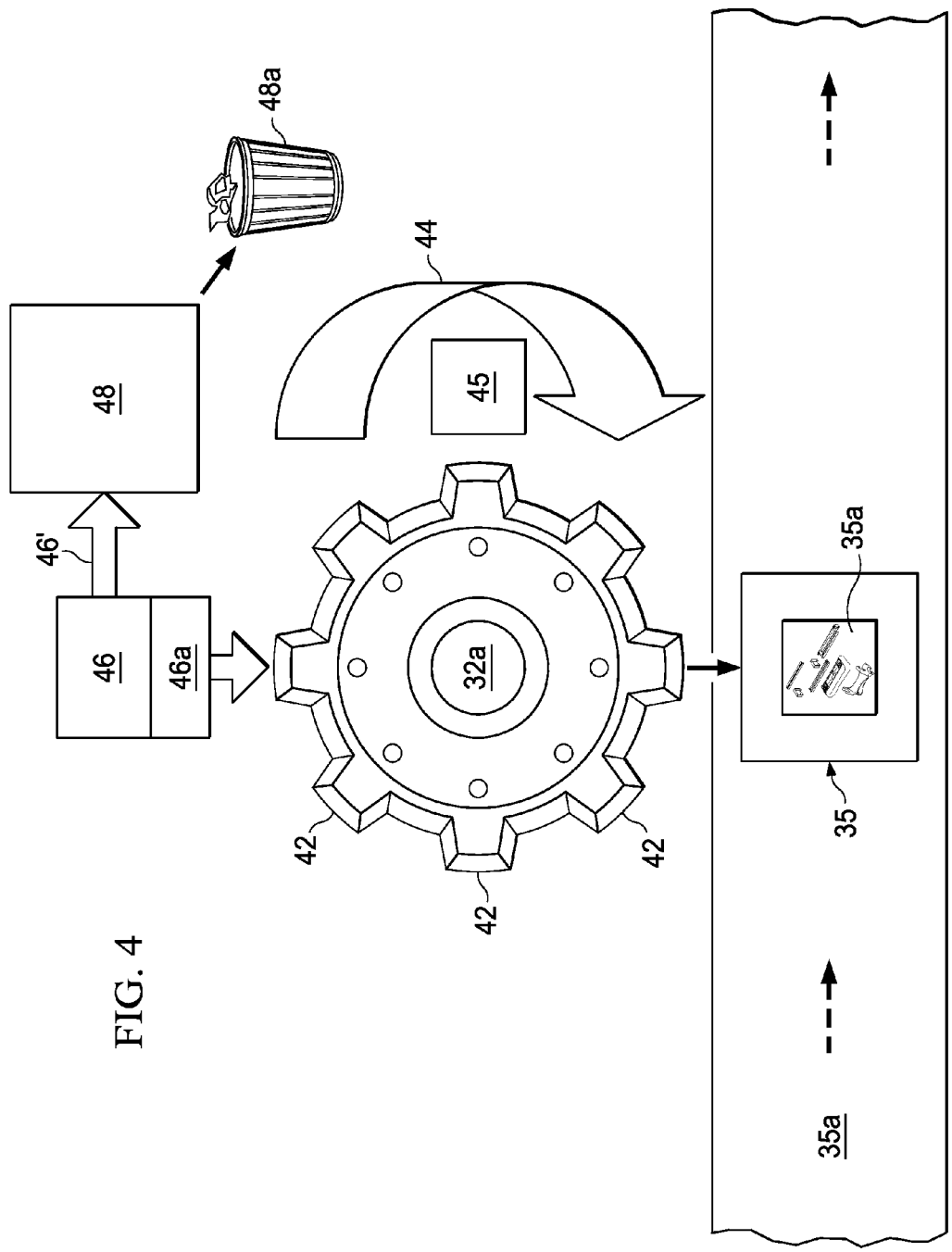
FIG. 4 is a schematic view of a head portion of pick/place component placement machine in accordance with the present invention.

Each of the heads 32a, 32b, 34a, 34b, 36a, 36b, 38a, and 38b may desirably be somewhat robot-like, driven by a motor 45 and may generally include an on-board vision system 46 (shown in FIG. 4). Such a vision system desirably assists in precision placement of components thereby reducing misalignment of components.

As discussed above, each head may desirably be able to "pick and place" similar or different types of components which together will form a razor cartridge. In a preferred embodiment, each head of the present invention may desirably comprise at least one nozzle or other tool capable of picking up and placing down, among other operations (e.g., cutting), at least one part (e.g., razor cartridge component). For instance, as shown in FIG. 4, head 32a of FIG. 3 is depicted including eight nozzles 42 mounted thereon.

In the present invention, at least one nozzle may be movable or rotatable about at least one axis where the at least one axis is an X axis, a Y axis, a Z axis, or any combination thereof.

Furthermore, in the present invention, at least one head may also be rotatable or movable about at least one axis, where at least one axis is an X axis, a Y axis, a Z axis, or any combination thereof. For instance, as shown in FIG. 4, head 32a may generally rotate in a clockwise direction 44.

In addition, the present invention further contemplates that each head and each nozzle may each be rotatable or movable about any axis simultaneously. Generally, the nozzle and the head are moving above a pallet, the latter which itself is also capable of movement about the X axis, Y axis, or Z axis, or any combination thereof.

For picking/placing razor components, the nozzles 42 shown in FIG. 4 may desirably utilize vacuum or suction or gripper actuation mechanisms, though any feasible mechanical, electrical, chemical, magnetic mechanism or any combinations thereof, is contemplated in the present invention.

In addition to picking and placing components such as razor cartridge components, the nozzles 42 may desirably perform other necessary types of operations for assembling razor cartridges. Additional operations may desirably include, but are not limited to, contacting, picking, placing, holding, snap fitting, articulated inserting, angular inserting, cutting, assembling, clipping, crimping, staking, orienting, transporting, dispensing, inspecting, identifying, cold heading, marking, stamping, printing (e.g., laser, ink), etching, force placement (e.g., pushing, moving, sliding) or other physical action or part movement, or any combination thereof, The operation of orienting may desirably include movements such as rotating, pivoting, swiveling, spinning, revolving, tilting, turning, aiming, twisting, pointing, inclining, rolling, or any combination thereof.

The head/nozzles of the modules may be adapted to dispense liquid or other chemistries into products, and may therefore be utilized to produce cartridges that incorporate formulations, such as the type utilized in the Venus Breeze gel bars and other liquid dispensing razor product families.

Accordingly, the present invention is capable of aptly balancing processes that may generally each require different takt times, (where takt time may generally be defined as the longest time spent on a particular operation to meet the demand level and where typically an entire line may have a takt time), or have different processing rates, such as low speed solidification of chemistries or formulations vis-à-vis high speed blade loading.

Furthermore, if components are supplied to modules (e.g., to the heads and/or nozzles) as strips of material (e.g., metal clip or lubricating strip material), the module, desirably via the nozzle or head of the present invention is thus capable of cutting, forming, and assembling the strips of material for placement into the appropriate cartridge location. A single clipping assembly has been demonstrated on similar modules at forming, loading and crimping over 400 clips per minute.

In addition, any of the aforementioned operations (e.g., orienting, cutting, etc.) may take place in conjunction with, simultaneously with, or in spatial relation to another operation. For instance, a nozzle may pick up two different components and be capable of performing operations on each of the components at different heights (e.g., place one component on top of the other or tilt one in relation to the other).

FIG. 4 also depicts a control unit 48 which may generally provide quality control functionality, such as the ability to track at least one razor component through the modules, to reject at least one razor component for defectiveness or malfunction, to reject a final assembled razor cartridge for defectiveness or malfunction, or any combination thereof. The control unit 48 may also include a display and software or computer aided design tools affording improvements to inspection and/or recognition of components before or after placement. Components that are found to be defective may generally be disposed of in a scrap bin 48a. The control unit 48 may be able to act "on the fly" if defective components are found and may also provide machine performance data and trending analyses.

The vision system 46 may be adapted to facilitate at least one of the operations of the nozzle (e.g., picking, holding, orienting, transporting and placing operations of the at least one razor component) and may generally include at least one camera 46a. In general, the vision system assists the machine in deciding where to move, etc. The camera 46a may be desirably configured to capture an image of at least one nozzle, of at least one head, of at least one razor component, of at least one razor cartridge component, partially assembled cartridge, completed cartridge, or any combination thereof. The vision system 46 and camera 46a may provide input 46' to the control unit 48 to assist the control unit in making quality determinations.

Advantageously, for instance, the control unit may desirably have the ability to repair a component, a partially assembled cartridge, a completed cartridge or any combination thereof, a feature not found in the prior art dedicated assembly systems. For instance, if the control unit determines a blade is missing from a partially assembled razor cartridge during assembly, the present invention machine may go back and obtain a blade to place in the razor cartridge, thereby repairing the cartridge, which in turn, reduces, scrap and may improve throughput, whereas in the prior art this cartridge would generally be scrapped or disposed of.

Referring now to FIG. 5, a flow diagram depicting the basic flow of the present invention is shown. At the start step 51, pallet 35 (not shown) is assumed to have moved proximal to or under the center of one of the modules, such as first module 32. Right after the start 51, at step 52, the first head (e.g., head 32a) of module 32 will generally load up its nozzles 42 with a desired number and mix of cartridge components from a feed system (e.g., feed system 33a). At step 54, head 32a will perform one or more operations on the razor cartridge components of the type described above. One operation for instance may be to deliver the component elsewhere or to orient it in a particular manner. The nozzles of head 32a will operate upon its required number of components until complete. At this point, pallet 35, being still center to or proximal to module 32 may then be acted up by head 32b of module 32 with steps 56 and 58 similar to steps 52 and 54 described above in conjunction with head 32a. Once all operations are completed by the first module 32, the pallet 35 moves to be proximal to the second module 34 where the flow is repeated for heads 34a and 34b of FIG. 3. This process then moves to the third module 36 and so on until completion.

Although the steps for just one module of FIG. 3 and in essence one cartridge are effectively shown in FIG. 5, the number of cartridges being processed may be variable which may dictate the number of loops in the flow per module that occur. In addition, with multi-head machines, many of these operations may be occurring concurrently, and thus, the flow shown in FIG. 5 may be extrapolated in parallel.

Figure 6A:
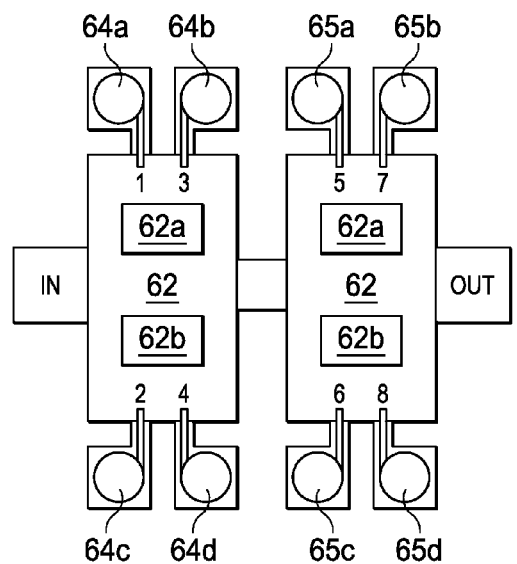
FIGS. 6A through 6C are schematic views of alternate embodiments where each module has two heads.
Figure 6B:
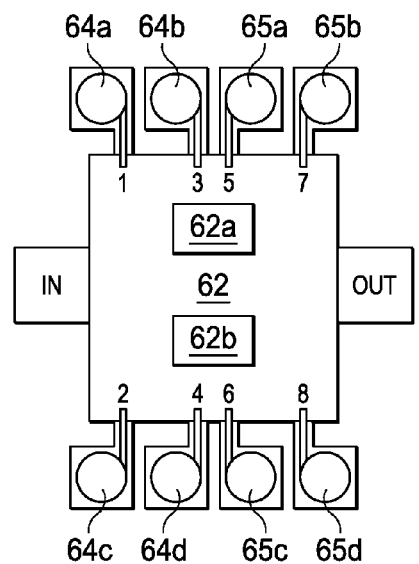
Figure 6C:
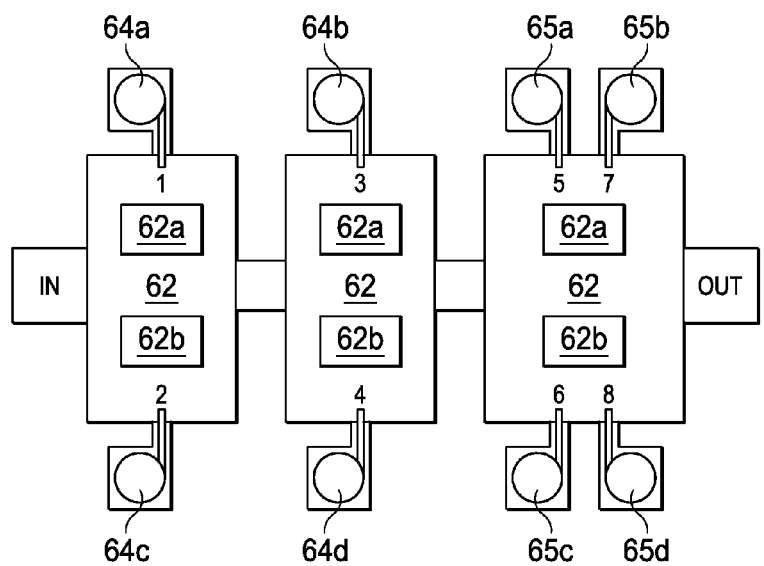

FIGS. 6A and 6C depict alternate embodiments of FIG. 3 of the present invention where arrangements of modules 62 are shown each having two heads 62a and 62b, and having feed systems 64a, 64b feeding a component type to head 62a, feed systems 64c, and 64d feeding a different component type to head 62b and feed systems 65a, 65b feeding yet another component type to head 62a and lastly feed systems 65c, and 65d feeding still yet another different component type to head 62b of module 62.

FIG. 6B shows one module 62, two-headed machine 62a and 62b, each head having four feed systems 64a, 64b, 64c, and 64d and 65a, 65b, 65c, and 65d, respectively, feeding heads 62a and 62b as described above with FIG. 6A.

Figure 6D:
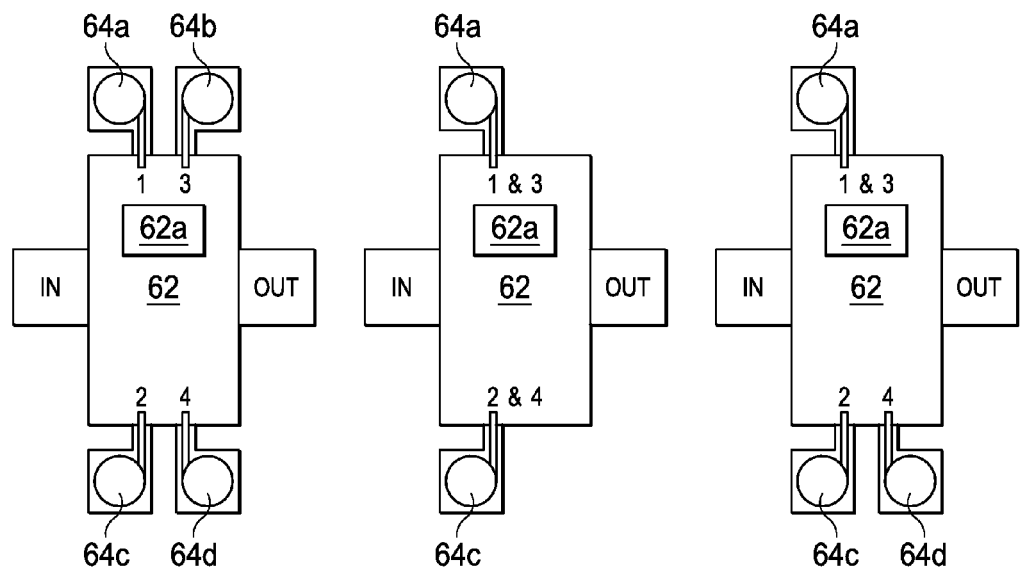
FIG. 6D shows schematic views of alternate embodiments where each module has a single head.

In FIG. 6D, in accordance with three alternate embodiments of the present invention, single head machines are depicted in each module 62 with two, three or four feed systems. For instance, single head 62a in module 62 is shown having up to four feed systems 64a, 64b, 64c, 64d capable of feeding or serving head 62a. Any number of feed systems capable of serving a single head is contemplated in the present invention.

Figure 7A:
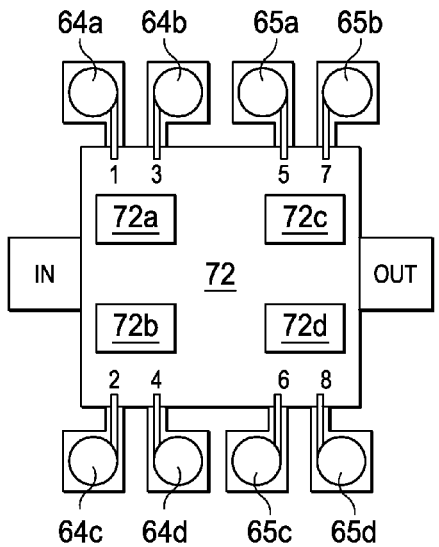
FIGS. 7A and 7C are schematic views of alternate embodiments of the present invention with each module having four heads and FIG. 7B is a schematic view of an alternate embodiment of the present invention with one module having four heads arranged with another module having two heads.
Figure 7B:
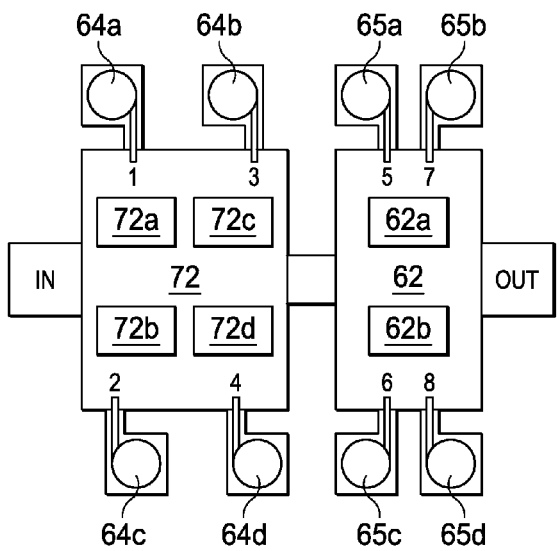
Figure 7C:
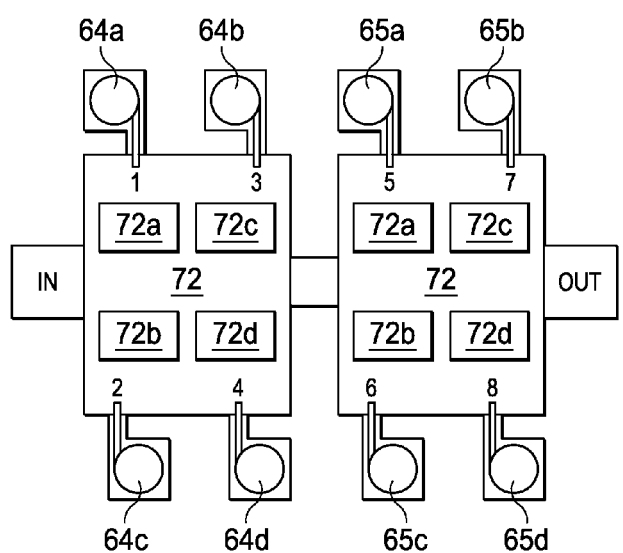

FIGS. 7A through 7C depict schematic views of alternate embodiments of the present invention with each module 72 having at least four heads 72a, 72b, 72c, 72d. FIG. 7B depicts an arrangement where module 72 of FIG. 7A with four-heads is arranged in conjunction with module 62 of FIG. 6B having two-heads. FIG. 7C depicts two equivalent modules 72 of FIG. 7A arranged serially.

As is evident, in some arrangements shown, the same eight feed systems, feed components to various arrangements of heads and modules. As clearly depicted, the modules are fairly modular and may generally be reconfigured or rearranged as may be necessary for a specific product assembly. As such, the embodiment shown in FIG. 6A may be arranged differently but perform the same functionality of the embodiment shown in FIG. 3.

It can be seen that there are any number of possible permutations of module, nozzle and head arrangements and that a user is thus free to select and design, based on need, different arrangements for different machine throughput, capital, floor-space and system requirements and still utilize the same basic physical operation. With such flexibility, scale-up and scale-down may occur more rapidly to maximize production needs. Thus, unlike the prior art, an arrangement for one product family, for instance the Gillette® Sensor® product family may be transferrable or reconfigurable for use of manufacturing other product family or families, such as the Gillette® Venus®, Gillette® Mach3®, or Gillette® Fusion® product families or vice-versa.

Nozzle operations may include contacting, picking, placing, holding, snap fitting, articulated inserting, angular inserting, cutting, assembling, clipping, crimping, staking, orienting (rotating, pivoting, swiveling, spinning, revolving, tilting, turning, aiming, twisting, pointing, inclining, rolling, or any combination thereof), transporting, dispensing, inspecting, identifying, cold heading, marking, stamping, printing, etching, force placement (e.g., pushing, moving, sliding) or other physical action or part movement, or any combination thereof, may be performed by nozzle structures, some of which will be described below in detail.

It should be noted that each nozzle may desirably be performing an operation or combination of operations and as such, "parallel operations" may be occurring.

Figure 8:
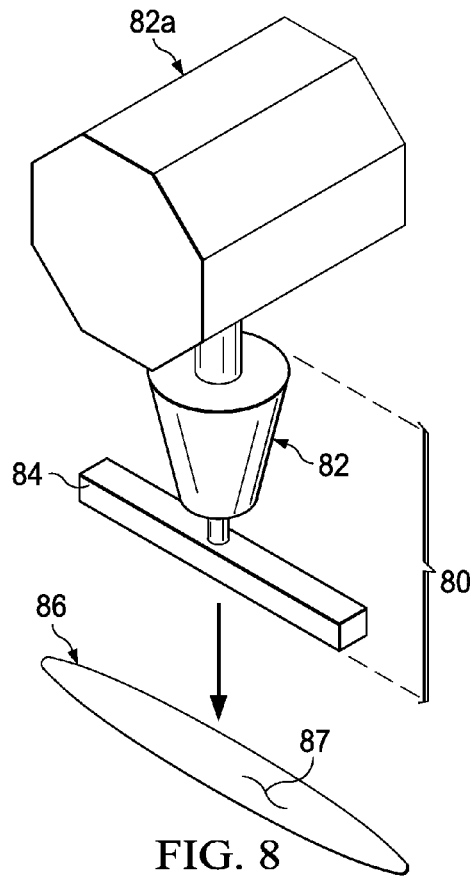
FIGS. 8-10 are schematic views of a nozzle having a novel adaptor for operating on a razor component in accordance with the present invention.

Referring now to FIG. 8, a nozzle extends from head 82a forming a novel nozzle structure 80 which includes a nozzle portion 82 having an outer or extension member 84 capable of contacting and/or operating on an exterior surface 87 of at least one razor component 86 in accordance with an alternate preferred embodiment of the present invention. Outer member or adaptor 84 may desirably include an elongated portion as shown in FIG. 8 which may desirably be a rigid bar comprised of metal, plastic, urethane, rubber or any combination thereof. The adaptor 84 may thus be customized in shape and size for contacting a specific type of component. For instance, by being elongated, adaptor 84 may provide better all-over support for an elongated razor component, such as a blade, a guard, or a lubricating strip. Depending on the cartridge or razor component structure, adaptor 84, which acts as an adapter, may or may not be necessary or a different type of adaptor may be required. It should be noted that any type of nozzle operation described herein may be performed on the razor component 86 being held by the nozzle.

Figure 9:
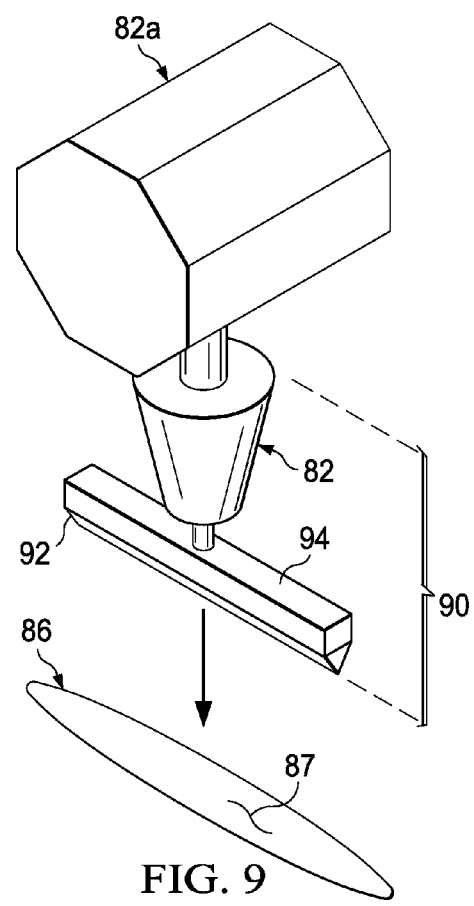

The adaptor 84 may also generally include any structure customized for contacting the exterior surface of a razor component 86. For instance, adaptor 94 may include an angled portion 92, (e.g., or a tapered portion) customized for contacting the exterior surface 87 of a razor component 86 such as the blade shown in nozzle structure 90 of FIG. 9.

Figure 10:
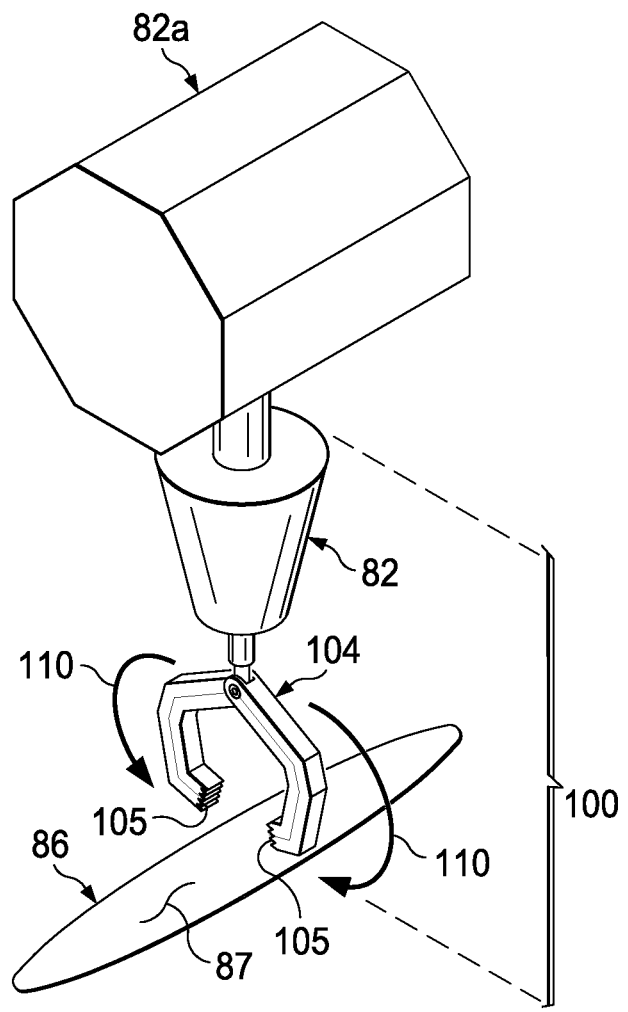

In an alternate embodiment of the present invention, at least one adaptor or adapter in the form of a gripper 104 having one or more gripper jaws 105 as shown in the nozzle structure 100 of FIG. 10 which may be actuated to move inward or outward (e.g., toward or away from each other) as indicated by arrows 110. The gripper jaws 105 may or may not be identical and may be customized or modified over prior art gripper jaws to advantageously grasp surfaces of razor components which otherwise may have been difficult to grasp or hard to balance (e.g., elongated elements such as blades or lubricating strips, or clips). The nozzle structure 100 may also generally include a vacuum means (not shown), magnetic, or other mechanical device for contacting cartridge components.

Accordingly, the nozzle structure may include any customized adaptor, extension or outer member, for advantageously performing any operation on at least one razor cartridge component. Various adaptors contemplated by the present invention are shown, though not exhaustively in FIG. 11. Generally, the adaptors are two or three dimensional, each dimension desirably ranging from about 10 mm to about 50 mm depending on the type of adaptor. They are attached to the nozzles of current standard modules via any means, but generally mechanical means. The vacuum ability of the nozzle generally also remains unchanged or easily adjusted to accommodate the type of adaptor. Additionally, these adaptors are beneficial over those of the prior art in that they are easily removable or inter-changeable. Moreover, standard module machines are generally capable of changing their own nozzles and thus accordingly, any attached adaptors and also a head may also recognize and self-adapt for whatever type of nozzle or adaptor is mounted thereon.

Figure 11A:
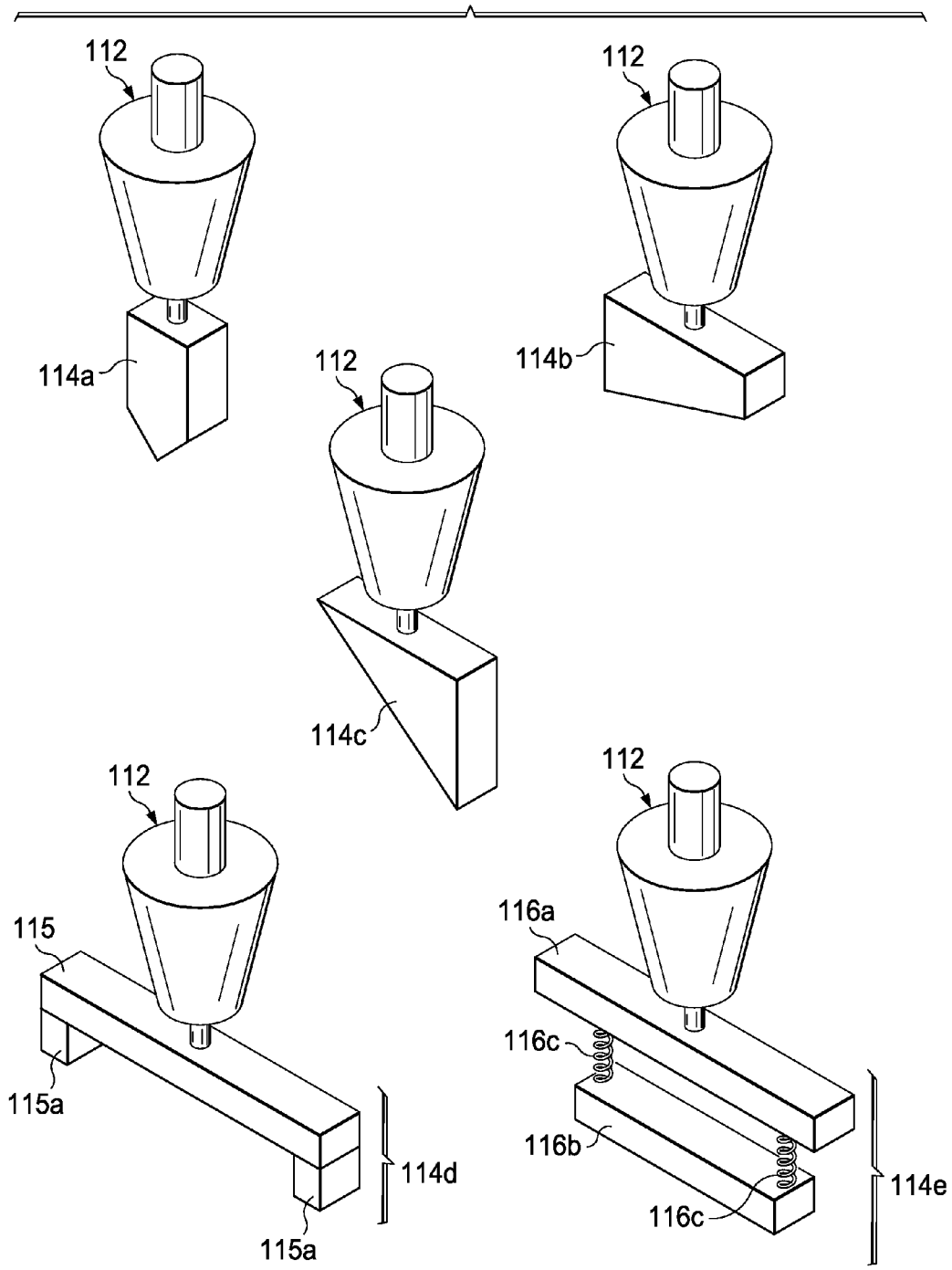

For instance, adaptor 114a of FIG. 11 is shown to include a point or triangulated outer structure which may aptly stake or assist in cutting or slitting. Outer member or adapter 114b has an angular base portion for beneficial picking up of angled components such as razor blades or for angular insertion. Adaptor 114c is shown as having a wider angle than that of adaptor 114b, but also capable of similar operations. Adaptor 114g is shown having a curved outer area 114g' also capable of similar operation as adaptors 114b and 114c except with the added benefit of applicability to any curved components such as blades. Adaptor 114d depicted as a rectangular rigid bar 115 with two base legs 115a may be capable of using legs 115a as guides while at about center of the rigid bar 115 a vacuum force from a nozzle or head provides stability.

Adaptor 114e is depicted as having two rectangular shaped bars, one upper 116a and one lower bar 116b, operatively coupled together via springs 116c allowing the lower bar flexibility when picking up or operating on a component. This type of adaptor may be useful for components that are generally more fragile, such as lubricating strips or clips, or which may require a lighter force or have a lighter weight.

Adaptor 114f is shown having a rounded end which may be aptly used for pushing in or inserting one component into another, e.g., a guard into housing. Adaptor 114h may desirably be used as a stamper, marker or printer capable of placing text or graphics or other indicia on a razor component. Adaptor 114h may also be desirably capable of laser date coding a component or finally formed cartridge. Adaptor 114i is shown having two moveable legs 117a which may turn towards each other or away from each other. This arrangement may be desirably suitable for use with a large part or orienting or splitting one part into two.

The modules and equipment to assemble cartridges described herein may also be used in combination with non-pick/place equipment (e.g., non-Printed Circuit Board, non-Electronic Component, or non-Semiconductor Assembly equipment) or other prior art layouts. For instance, the modules described herein may incorporate equipment used in the prior art such as described above in the Background of the Invention section with regard to custom designed tooling, gauging, and assembly equipment.

In addition, the present invention contemplates the application of the modules described herein to the manufacture other types of consumer product areas and components thereof such as beauty care/cosmetic, medical and dental products, and powered versions thereof. For instance, in the beauty care/cosmetic area, a minor compacts may be formed using the pick/place modules described herein where plastic, mirror, and powder/liquid formulations components are assembled. Similarly, in the dental area, a toothbrush may be formed using a pick/place assembly machine to assemble the various toothbrush components (e.g., head, handle, bristles). Customized modifications may be made to the outer or adaptors 84, 94, or 105 of the nozzle structures above to adequately pick up a cosmetic component or a dental component.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a razor cartridge comprising utilizing a pick/place component placement machine comprising a plurality of nozzles, each said nozzle performing a plurality of operations on a plurality of razor cartridge components, wherein each component of said plurality of razor cartridge components is combined to form a fully assembled razor cartridge and selected from a supply of razor cartridge components wherein said plurality of nozzles are coupled to at least one head, said at least one head rotatable about at least one axis, said at least one axis comprising an X axis, a Y axis, a Z axis, or any combination thereof and wherein a first operation of the plurality of operations comprises disposing one or more blades into a housing and a second operation of the plurality of operations comprises disposing a pair of clips over said one or more blades and into said housing.

2. The method of claim 1 wherein one or more of said plurality of nozzles performs at least one operation comprising contacting, picking, placing, holding, snap fitting, articulated inserting, angular inserting, cutting, assembling, clipping, crimping, staking, orienting, transporting, dispensing, inspecting, identifying, cold heading, marking, stamping, printing, etching, force placement or other physical action or part movement, or any combination thereof, to one or more of said plurality of razor cartridge components.

3. The method of claim 2 wherein said plurality of razor cartridge components comprises at least one cartridge housing, frame, or platform, at least one razor blade, at least one cap, at least one guard, at least one overcap, at least one dispenser, at least one dispenser container, at least one trimmer, at least one trimmer frame, at least one clip, at least one lubricating strip or other chemistry, at least one cartridge connecting structure, or any combination thereof, said razor cartridge components selected from a supply of at least one type of razor cartridge components disposed on at least one pallet.

4. The method of claim 2 wherein one or more of said plurality of nozzles is adapted depending on a type of said razor cartridge component.

5. The method of claim 2 further comprising an adaptor coupled to one or more of said plurality of nozzles comprising an elongated portion, an angled portion, a tapered portion, a gripper portion, a curved portion, a rounded portion, a pointed tip, a stamper, a marker, a printer, a guide portion, a spring portion, a moveable leg, or any combination thereof, for operating on said plurality razor cartridge components.

6. The method of claim 5 wherein said adaptor is comprised of metal, plastic, urethane, rubber, or any combination thereof.

7. The method of claim 5 wherein said elongated portion comprises a rigid bar.

8. The method of claim 1 wherein one or more of said plurality of nozzles utilizes mechanical, electrical, chemical, magnetic, suction or vacuum mechanisms, or any combination thereof.

9. The method of claim 1 wherein said plurality of razor cartridge components is selected from a supply of at least one type of razor cartridge components disposed on at least one pallet.

10. The method of claim 1 further comprising tracking said razor cartridge components using a quality control system, to reject or repair a razor cartridge component, a partially assembled razor cartridge, a completed razor cartridge, or any combination thereof.

11. The method of claim 1 further comprising capturing an image of said at least one razor cartridge component, a partially assembled razor cartridge, a completed razor cartridge, or any combination thereof using a vision system.

* * * * *